US012743555B2

(12) United States Patent
Sibert et al.

(10) Patent No.: US 12,743,555 B2
(45) Date of Patent: Sep. 22, 2026

(54) APPLICATION INTEGRITY ATTESTATION

(71) Applicant: Apple Inc., Cupertino, CA (US)

(72) Inventors: Hervé Sibert, Le Mans (FR); Eric D. Friedman, Berkeley, CA (US); Erik C. Neuenschwander, San Mateo, CA (US); Jerrold V. Hauck, Windermere, FL (US); Thomas P. Mensch, Sunnyvale, CA (US); Julien F. Freudiger, San Francisco, CA (US); Alan W. Yu, Vancouver (CA)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/463,744

(22) Filed: Sep. 8, 2023

(65) Prior Publication Data

US 2024/0078343 A1 Mar. 7, 2024

Related U.S. Application Data

(63) Continuation of application No. 16/683,233, filed on Nov. 13, 2019, now Pat. No. 11,790,119.

(Continued)

(51) Int. Cl.

*G06F 21/64* (2013.01)
*H04L 9/14* (2006.01)
*H04L 9/32* (2006.01)

(52) U.S. Cl.

CPC ................ *G06F 21/64* (2013.01); *H04L 9/14* (2013.01); *H04L 9/3236* (2013.01); *H04L 9/3263* (2013.01); *H04L 9/3271* (2013.01)

(58) Field of Classification Search

CPC ......... G06F 21/64; H04L 9/14; H04L 9/3236; H04L 9/3263; H04L 9/3271

See application file for complete search history.

(56) References Cited

U.S. PATENT DOCUMENTS 9,569,618 B2 2/2017 Lee et al.
10,867,016 B2 * 12/2020 Gidley .................... G06F 21/54

(Continued)

FOREIGN PATENT DOCUMENTS

EP 3378005 A1 9/2018
KR 20180110432 A * 10/2018
WO 2017085159 5/2017

OTHER PUBLICATIONS

International Search Report and Written Opinion in PCT Appl. No. PCT/US2019/061846 mailed Feb. 26, 2020, 12 pages.

(Continued)

*Primary Examiner* — Jeffrey C Pwu
*Assistant Examiner* — Mayasa A. Shaawat
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to application verification. In various embodiments, a computing device includes a secure circuit configured to maintain a plurality of cryptographic keys of the computing device. In such an embodiment, the computing device receives, from an application, a request for an attestation usable to confirm an integrity of the application, instructs the secure circuit to use one of the plurality of cryptographic keys to supply the attestation for the application, and provides the attestation to a remote computing system in communication with the application. In some embodiments, the secure circuit is configured to verify received metadata pertaining to the identity of the application and use the cryptographic key to generate the attestation indicative of the identity of the application.

16 Claims, 11 Drawing Sheets

Related U.S. Application Data

(60) Provisional application No. 62/768,540, filed on Nov. 16, 2018.

(56) References Cited

U.S. PATENT DOCUMENTS

| | | | | |
|---|---|---|---|---|
| 2011/0173643 | A1* | 7/2011 | Nicolson | G06F 21/575 719/328 |
| 2014/0325644 | A1 | 10/2014 | Oberg et al. | |
| 2015/0200934 | A1* | 7/2015 | Naguib | H04L 9/3247 713/168 |
| 2016/0142212 | A1* | 5/2016 | Sarangdhar | H04L 9/3234 713/156 |
| 2016/0274918 | A1 | 9/2016 | Moon | |
| 2017/0244729 | A1 | 8/2017 | Fahrny et al. | |
| 2017/0373843 | A1 | 12/2017 | Benson et al. | |
| 2018/0183586 | A1 | 6/2018 | Bhargav-Spantzel et al. | |

OTHER PUBLICATIONS

Mensch, et al., “Silicon Key Attestation,” U.S. Appl. No. 15/435,229, filed Feb. 16, 2017, 55 pages.

Rashmi Kasodhan et al., “A New Approach of Digital Signature Verification based on BioGamal Algorithm,” 2019 3rd International Conference on Computing Methodologies and Communication (ICCMC), Aug. 29, 2019, 6 pages.

Zhou Xiaoou and Hash, https://ricc.com.cn/articles-867, Mar. 14, 2019, 6 pages.

Search Report in Notice of Grant for CN Pat. App. No. 201980074808.5 mailed Jul. 25, 2024, 3 pages.

Office Action in U.S. Appl. No. 201980074808.5 mailed Mar. 13, 2024, 4 pages.

Office Action in U.S. Appl. No. 19817884.0 mailed Jun. 6, 2024, 6 pages.

* cited by examiner

APPLICATION INTEGRITY ATTESTATION

The present application is a continuation of U.S. application Ser. No. 16/683,233, entitled "APPLICATION INTEGRITY ATTESTATION," filed Nov. 13, 2019, which claims priority to U.S. Provisional App. No. 62/768,540, entitled "APPLICATION INTEGRITY ATTESTATION," filed Nov. 16, 2018; the disclosures of each of the above-referenced applications are incorporated by reference herein in their entireties.

BACKGROUND

Technical Field

This disclosure relates generally to computing devices, and, more specifically, to verifying applications executing on a computing device.

Description of the Related Art

In some instances, a bad actor may attempt to modify an application running on a computing device so that it does not operate as intended by a developer. For example, an application may place restrictions on various functions supported by the application until the bad actor purchases a license. To avoid purchasing a license, a bad actor may modify the application to circumvent these restrictions. As another example, an application might provide various awards based on location data supplied by the device. A bad actor might then attempt to modify the application (or install a modified version of the application) that allows the bad actor to falsify location information in order to obtain additional rewards.

Figure 1A:
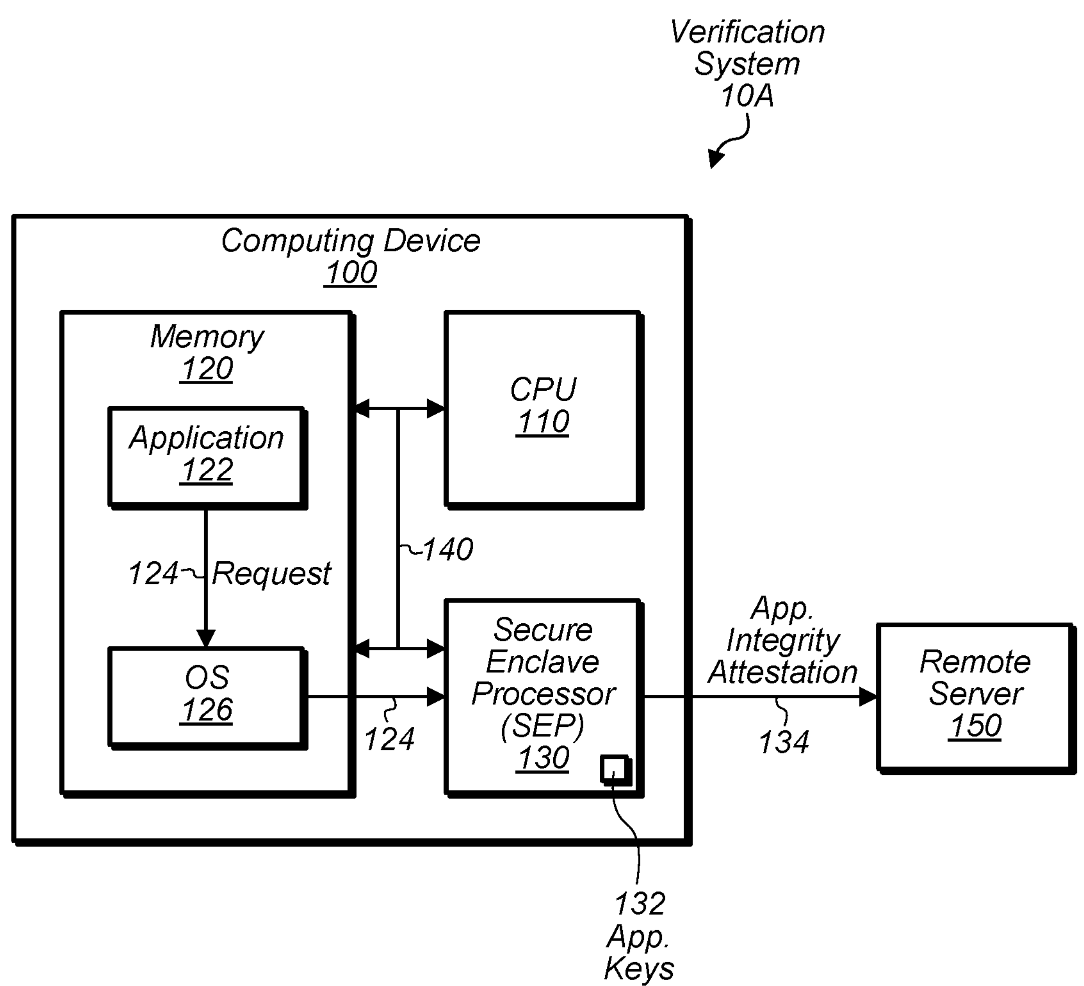
FIG. 1A is a block diagram illustrating an example of a system for generating an attestation for a verified application.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to generate an attestation" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a computing device can provide an attestation indicative of an application's integrity/validity. As used herein, the term "integrity" is used to describe an application that has not been modified in an unauthorized manner. Accordingly, an application would be said to lack integrity if, for example, it has been modified by a bad actor to operate in a manner unintended by the developer. As will be discussed in greater detail below, an application executing on a computing device may connect to a remote service in order to perform some function. To attest to its integrity, in various embodiments, the application can request an attestation from the computing device that is provided based on a verification of the application. In some embodiments, this verification is performed in part by a secure circuit of the computing device. If the verification is successful, the secure circuit generates the requested attestation, which is signed with a cryptographic key maintained by the secure circuit. In various embodiments, this cryptographic key is specific to the application and/or the current user of the application. After the attestation has been issued by the secure circuit, the application may provide the attestation to the remote service in order to attest that the application has not been improperly modified. In other embodiments discussed below, the verification and attestation generation may be handled by an operating system of the computing device, a remote server, the secure circuit, or a combination thereof. In many instances, implementing a verification system in this manner can reduce the likelihood that a computing device is executing an improperly modified application.

Turning now to FIG. 1A, a block diagram of a verification system 10A is depicted. In the illustrated embodiment, system 10A includes a computing device 100, which includes a central processing unit (CPU) 110, memory 120, and a secure enclave processor (SEP) 130 coupled together via an interconnect 140. Memory 120 includes an application 122 and an operating system (OS) 126. System 10A further includes a remote server 150. In some embodiments, system 10A may be implemented differently than shown—e.g., system 10A may include an attestation server as discussed below with respect to FIG. 1B, computing device 100 may include one or more components discussed below with respect to FIG. 5, etc.

Application 122, in various embodiments, is executable to connect to a remote service, which, in the illustrated embodiment, is provided by remote server 150. Application 122 may correspond to any suitable application, which is potentially vulnerable to undesired modification. Similarly, remote server 150 may correspond to any suitable computer system and may provide any suitable service. For example, application 122 may be an application attempting to retrieve content from server 150 in order to present that content to the user. As another example, application 122 may be a multiplayer game that is attempting to connect to server 150, so a user can play against other users. In some embodiments, remote server 150 is operated by a developer of application 122; in other embodiments, server 150 may be operated by some other entity.

As noted above, in various embodiments, application 122 can provide an attestation 134 to remote server 150 in order to attest to its integrity—e.g., that it has not been modified in some unauthorized manner. In some embodiments, remote server 150 may request an attestation 134 as a prerequisite to establishing a connection with application 122 (or providing any service requested by application 122). As will be discussed below, in some embodiments, attestation 134 is a signed challenge issued by remote server 150 and signed using an application key 132 maintained by SEP 130. After receiving an attestation 134, remote server 150 may then attempt to verify attestation 134. In some embodiments, remote server 150 may also perform a user authentication distinct from verification of the received attestation 134. As shown, application 122 may issue a request 124 to OS 126 in order to have an attestation 134 generated.

OS 126, in various embodiments, is executable to manage various operations of computing device 100. In the illustrated embodiment, OS 126 facilitates interfacing application 122 and SEP 130, which may be provided by an application programming interface (API) supported by OS 126. Accordingly, application 122 may issue request 124 as an API call to OS 126, which, in turn, may provide request 124 to SEP 130. OS 126 may also return an attestation 134 generated by responsive to the request via the API to application 122 for delivery to remote server 150. In some embodiments, OS 126 also participates in the verification of application 122 as will be discussed below and, in some embodiments, even generates attestation 134.

SEP 130, in various embodiments, is a secure circuit configured to perform cryptographic services for computing device 100. As used herein, the term “secure circuit” refers to one of a class of circuits that is configured to perform one or more services and return an authenticated response to an external requester. A result returned by a secure circuit is considered to have indicia of trust exceeding that of a circuit that merely returns a result without any form of authentication. In some embodiments, responses from SEP 130 are authenticated through the use of cryptography such as providing a digital signature or encrypted data. In some embodiments, responses from SEP 130 are authenticated by being communicated through a trusted communication channel such as a dedicated bus between SEP 130 and the other party or a mailbox mechanism discussed below. In contrast, a circuit such as a hardware accelerator that merely operates on some received value and returns a result would not be considered a secure circuit within the meaning of this disclosure. By authenticating results that are returned, such as by signing with a verifiable digital signature, a secure circuit may thus provide anti-spoofing functionality. Additionally, in some cases, a secure circuit may be said to be “tamper-resistant,” which is a term of art referring to mechanisms that prevent compromise of the portions of the secure circuit that perform the one or more services.

In some embodiments, SEP 130 is configured to generate an attestation 134 for an application 122 and to verify the application 122 prior to providing attestation 134. As will be discussed in greater detail below with respect to FIGS. 2A-2E, this verification may include receiving various metadata from application 122 attesting the identity of application 122 and its integrity. In various embodiments, this metadata includes an application certificate supplied by a developer and including one or more signed hash values generated from a valid copy of application 122. In some embodiments, the certificate may also include an identify of the application as well as various other criteria defined by the developer. Accordingly, in response to receiving this metadata, SEP 130 may verify the application certificate and verify that hash values generated from application 122 match those in the application certificate. In some embodiments, this verification may be performed in part (or entirely) by operating system 126. For example, in one embodiment, OS 126 may generate one or more hash values from application 122 and supply them to SEP 130, which compares them against the signed hash values supplied by the developer. In another embodiment, OS 126 performs the comparison and indicates a result of the comparison to SEP 130, which verifies the result prior to generating an attestation 134. (In still other embodiments, verification and/or generation may be handled by an attestation server as will be discussed below with respect to FIG. 1B.) In various embodiments, this verification may be performed during an enrollment of application 122 and/or during generation of attestation 134.

In some embodiments, before a request 124 for an attestation can be issued, application 122 may perform an initial enrollment in which SEP 130 generates an application key 132 for use in subsequent generations of attestations 134. In some embodiments, this enrollment may be performed when application 122 is installed or updated (or if a new user is added). During the enrollment, SEP 130 may derive a public key pair having a public key and a private key corresponding to application key 132. In some embodiments, these derived keys are unique to a given device 100 (or SEP 130)—accordingly, two devices 100 would include different keys. In some embodiments, these derived keys are unique to an application 122 on device 100 (or even unique to the version of application 122). In some embodiments discussed below, derived keys are also unique to a particular user—accordingly, an application 122 having two users would supply attestations 134 generated using separate keys 132. In various embodiments, enrollment may also include SEP 130 generating a certificate for the public key pair-in doing so, SEP 130 may be acting as a certificate authority (CA). This certificate may include the pubic key and be conveyed to remote server 150 along with attestation 134 so that the public key can be used by remote server 150 to verify the attestation 134. In some embodiments, this certificate may include additional content such as a reference to the developer certificate used in the verification, the signed hash values from the certificate, etc. In some embodiments, this certificate (as well as the other certificates described herein) is X.509 compliant.

After enrollment, an application 122 may issue a request 124 for an attestation 134—e.g., when it intends to establish a connection with remote server 150. In response to a successful verification of application 122, in some embodiments, SEP 130 is configured to retrieve the corresponding application key 132 and generate a correspond attestation 134. As noted above, in some embodiments, this generation include signing a challenge issued by remote server 150. SEP 130 may, however, sign other information to generate attestation 134 such as the hash values generated from application 122, a timestamp, etc. Although not depicted in FIG. 1A for simplicity, SEP 130 may supply the attestation 134 via OS 126 to application 122, which may deliver it to remote server 150 for verification. Application 122 may also supply a certificate obtained during enrollment and including the public key usable to verify attestation 134. In some embodiments, the application certificate and/or a root certificate associated with manufacturer for device 100 may also be conveyed to remote server 150 to facilitate verification of the attestation 134.

Figure 1B:
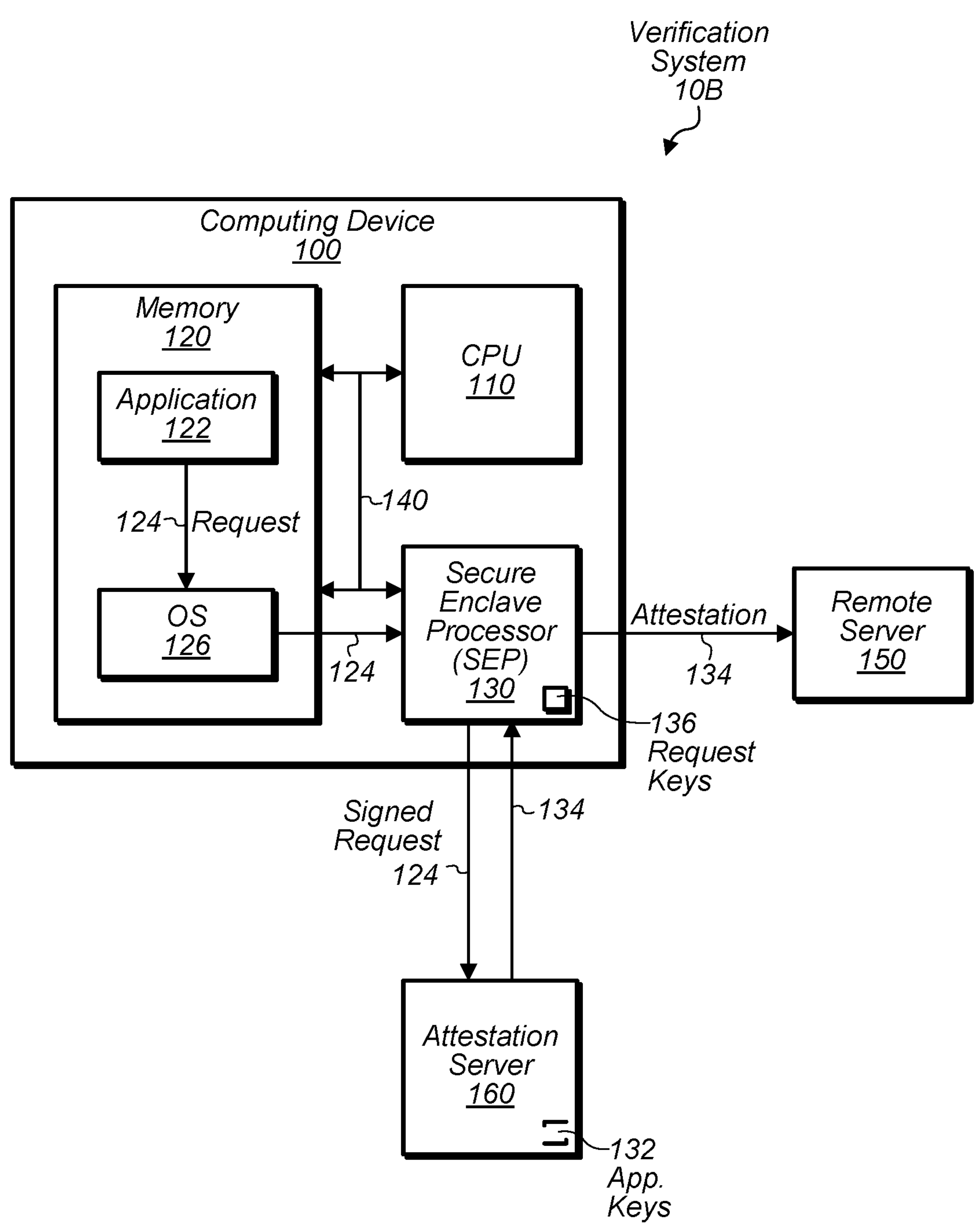
FIG. 1B is a block diagram illustrating another example of a system for generating an attestation for a verified application.

Turning now to FIG. 1B, a block diagram of a verification system 10B is depicted. As noted above, application verification and/or attestation generation may be performed by an external server. Accordingly, in the illustrated embodiment, verification system 10B includes elements 100-150 as discussed above with respect to FIG. 1A and further includes an attestation server 160 configured to perform application verification and/or attestation generation. In some embodiments, system 10B may be implemented differently than shown. Although labeled as a server, computing system 160 may correspond to any suitable computing device such a neighboring device to computing device 100, a device associated to the same cloud-based account as device 100, any of the computing devices listed below with respect to FIG. 5, etc.

In embodiments in which attestation server 160 performs verification, attestation server 160 may receive a request 124 including metadata about application 122 to verified by server 160. In the illustrated embodiment, SEP 130 signs the request 124 using a request key 136 in order to attest that the request 124 is coming from a valid device 100 (and also a device including SEP 130). In such an embodiment, attestation server 160 verifies the signature of request 124 along with the accompanying metadata, which may be verified in a similar manner as discussed above and in greater detail below. In some embodiments, metadata provided to server 160 may be obfuscated such that server 160 is able to verify it without knowing the full content of the metadata. For example, the metadata in request 124 may include a hash value of application 122's name (rather than the actual name) in order to obfuscate the name to server 160. In various embodiments, any metadata conveyed to server 160 is conveyed in a manner compliant with well-established privacy policies and/or privacy practices. A user may also "opt out" of participation such as discussed below. In some embodiments in which server 160 is not responsible for generating attestation 134, server 160 may send a result of the verification to SEP 130 (or more generally device 100), which may generate an attestation 134 based on the received result. In still other embodiments, SEP 130 (or OS 126) may maintain application keys 132, but server 160 may certify those keys 132 in response to receiving and verifying a request 124. In particular, request 124 may be a certificate signing request (CSR) including a public key corresponding to an application key 132 (the key 132 being a private key in such an embodiment) along with a signature generated from key 132. After verifying information in request 124, server 160 may issue a corresponding certificate for the key 132. This certificate may later be presented with an attestation 134 to server 150, which may use the certificate to verify the attestation 134.

In embodiments in which attestation server 160 performs generation of attestation 134, attestation server 160 may retrieve an application key 132 and produce attestation 134 by generating a digital signature using key 132 as discussed above and in greater detail below. In embodiments in which server 160 performs application verification, this attestation 134 may be produced based a result of server 160's verification. In other embodiments, SEP 130 and/or OS 126 may perform the verification and indicate a result of the verification to server 160 to cause it to provide an attestation 134. In still other embodiments discussed below with respect to FIG. 2C, server 160 may generate a public key pair and provide the pair to device 100 (specifically OS 126) to enable it to generate attestations 134.

Figure 2A:
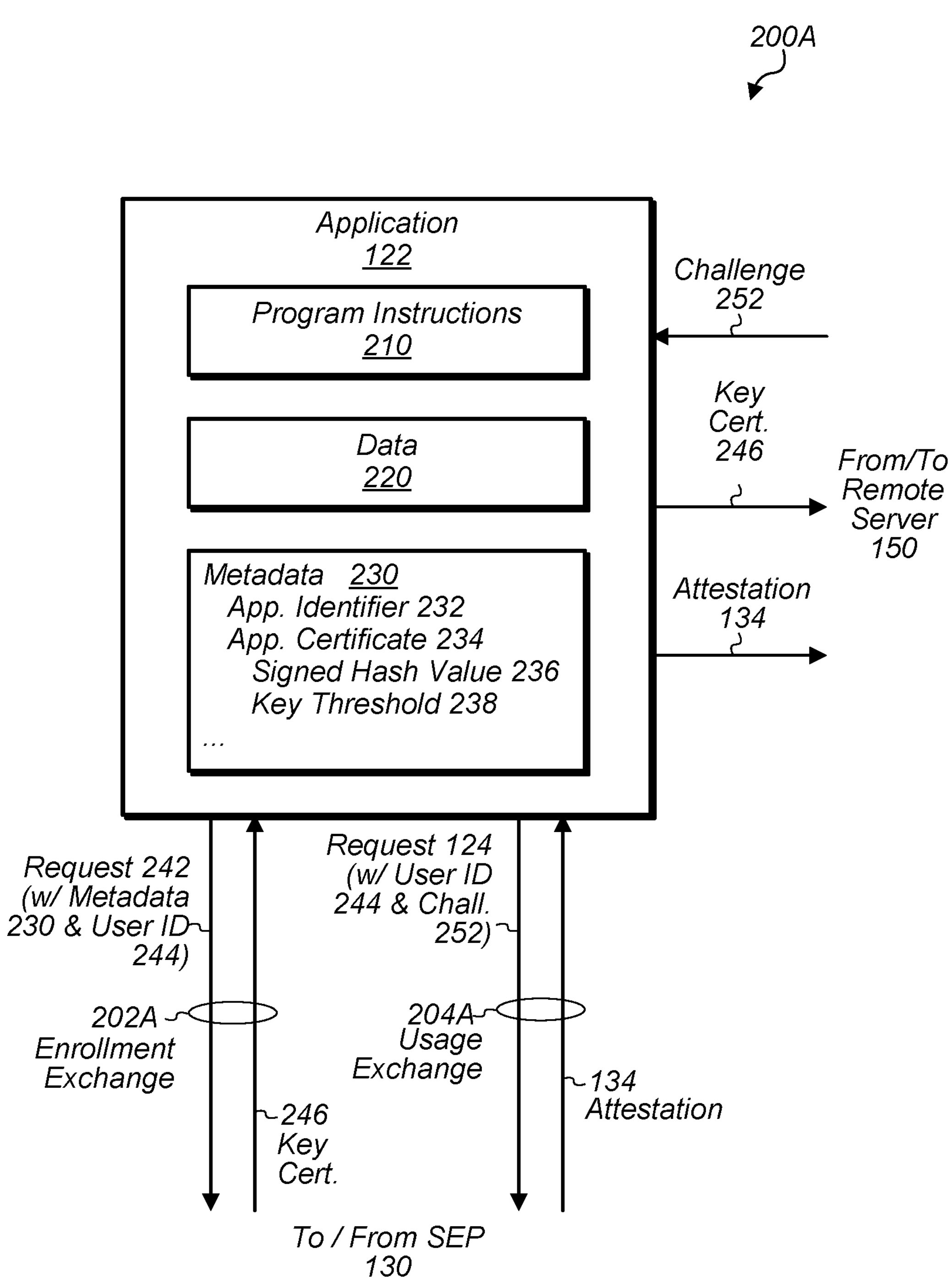
FIG. 2A is a block diagram illustrating an example of an application requesting an attestation from a secure enclave processor within a computing device of the system.

Turning now to FIG. 2A, a block diagram of an interaction 200A to obtain an attestation 134 generated by SEP 130 is depicted. In the illustrated embodiment, application 122 includes program instructions 210, data 220, and metadata 230, which may be used to verify application 122 and obtain attestation 134 as will be discussed below. In some embodiments, interaction 200A may be implemented differently—e.g., metadata 230 may not be included in application 122, metadata 230 may include more (or less) elements, request 124 may include metadata 230, etc.

Metadata 230, in various embodiments, is information about application 122 and usable to verify application 122. In the illustrated embodiment, metadata 230 includes an application identifier 232 and application certificate 234, which includes one or more signed hash values 236 and a key threshold 238. In various embodiments, application identifier 232 is a value that uniquely identifies application 122 such as a name of application 122, a version number, a random value, or a combination thereof. In some embodiments, identifier 232 may be included in certificate 234. In various embodiments, application certificate 234 is a certificate issued by a developer of application 122 (or an app. store selling application 122) with hash values 236 generated by applying a hash function to program instructions 210 for a valid copy of application 122 and signing the hash values using a private key, which may have a corresponding public key included in certificate 234. Accordingly, if program instructions 210 are subsequently modified, any subsequently generated hash values from instructions 210 may then deviate from signed hash values 236.

Key threshold 238, in various embodiments, is a set of one or more criteria pertaining to application keys 132. As noted above, in some embodiments, an application key 132 may be generated for each user of a particular application 122. In such an embodiment, key threshold 238 may limit the number of keys 132 that can be generated for users of application 122. For example, threshold 238 may specify that keys 132 can be generated for up to five users. If a request 242 is received to generate a sixth key 132 for a sixth user, SEP 130 may deny this request (or replace one of the already generated keys 132 such as removing a particular user's previously generated key 132 in response to receiving a request to generate a new key for the particular user). In another embodiment, key threshold 238 may limit the number of keys 132 that can be generated based on the number of versions of an application 122. For example, if a developer has released two versions of an application (e.g., version 1.0 and version 2.0), key threshold 238 may indicate that up to two keys 132 may be generated assuming that version 1.0 was initially installed and then updated to version 2.0. In some embodiments, key threshold 238 may also be used to limit the number of issued certificates that are valid for application 122 at a given point in time. In some instances, placing restrictions on keys 132 (and/or certificates 246) may prevent a malicious actor from achieving some benefit by creating multiple keys 132 such as those tied to fraudulent user accounts versions, etc.

As noted above, enrollment exchange 202A may be performed to establish an application key 132 usable to generate a subsequent attestation 134. As shown, exchange 202A may be include application 122 sending an enrollment request 242 to SEP 130. In the illustrated embodiment, this request 242 includes metadata 230 and a user identifier 244. In some embodiments, user identifier 244 is an index value used to look up what key 136 should be used for a given application 122 when multiple keys have been generated for multiple users. Accordingly, user identifier 244 may correspond to any suitable value usable to distinguish one user's key 136 from another's key 136. For example, in one embodiment, identifier 244 is a random value assigned to a user to distinguish it from other users. In other embodiments, identifier 244 may be some value known to server 150. For example, in one embodiment, identifier 244 is a hash value of a user account used by the user of application 122 to access remote server 150. In other embodiments, other types of index values may be used for looking up a key 136 associated with a particular application 122. In response to receiving metadata 230, SEP 130 may verify that it correctly corresponds to application 122. As noted above, this may include SEP 130 (or OS 126) reading program instructions and/or data 220 to generate one or more hash values, which are compared against signed hash values 236. In some embodiments, SEP 130 may also confirm that generating a new key 132 complies with key threshold 238. If the verification is successful, SEP 130 may generate a public key pair and return a corresponding key certificate 246. In various embodiments, key certificate 246 includes the public key of the public key pair and a signature generated with the private key, which is application key 132. In some embodiments, key certificate 246 may further include at least a portion of metadata 230 such as application identifier 232 and/or signed hash values 236. In some embodiments, certificate 246 may include a reference to application certificate 234 such as the digital signature from certificate 234. In some embodiments, certificate 246 may include user identifier 244—e.g., to enable remote server 150 also rely on attestation 134 to authenticate a particular user associated with application key 132. In many instances, enrollment 202A may be performed only once in order to allow many subsequent performances of usage exchanges 204A.

Once enrollment exchange 202A has been performed, application 122 may perform a usage exchange 204A when it wants an attestation 134. In some embodiments, exchange 202A may begin with application receiving a challenge 252, which may include random data or some other value supplied by remote server 150 in order to prevent a potential replay attack. As shown, application 122 may then convey the challenge 252 along with the user identifier 244 in a request 124 to obtain an attestation 134. In the illustrated embodiment, request 124 does not include metadata 230 as this was verified in enrollment. In other embodiments, however, metadata 230 may be included in request 124 and verified by SEP 130. In response to receiving request 124, SEP 130 may retrieve the appropriate key 132 for application 122 based on user identifier 244 (or some other type of key index). SEP 130 may then use the key 132 to generate a digital signature from challenge 252 and provide the signature as attestation 134 to application 122. Application 122 may then provide key certificate 246 and attestation 134 to remote server 150, which verifies attestation 134 using key certificate 246. If the verification is successful (meaning that application 122 has been verified by SEP 130 as corresponding to application certificate 234), remote server 150 may proceed to provide a requested service to application 122.

Figure 2B:
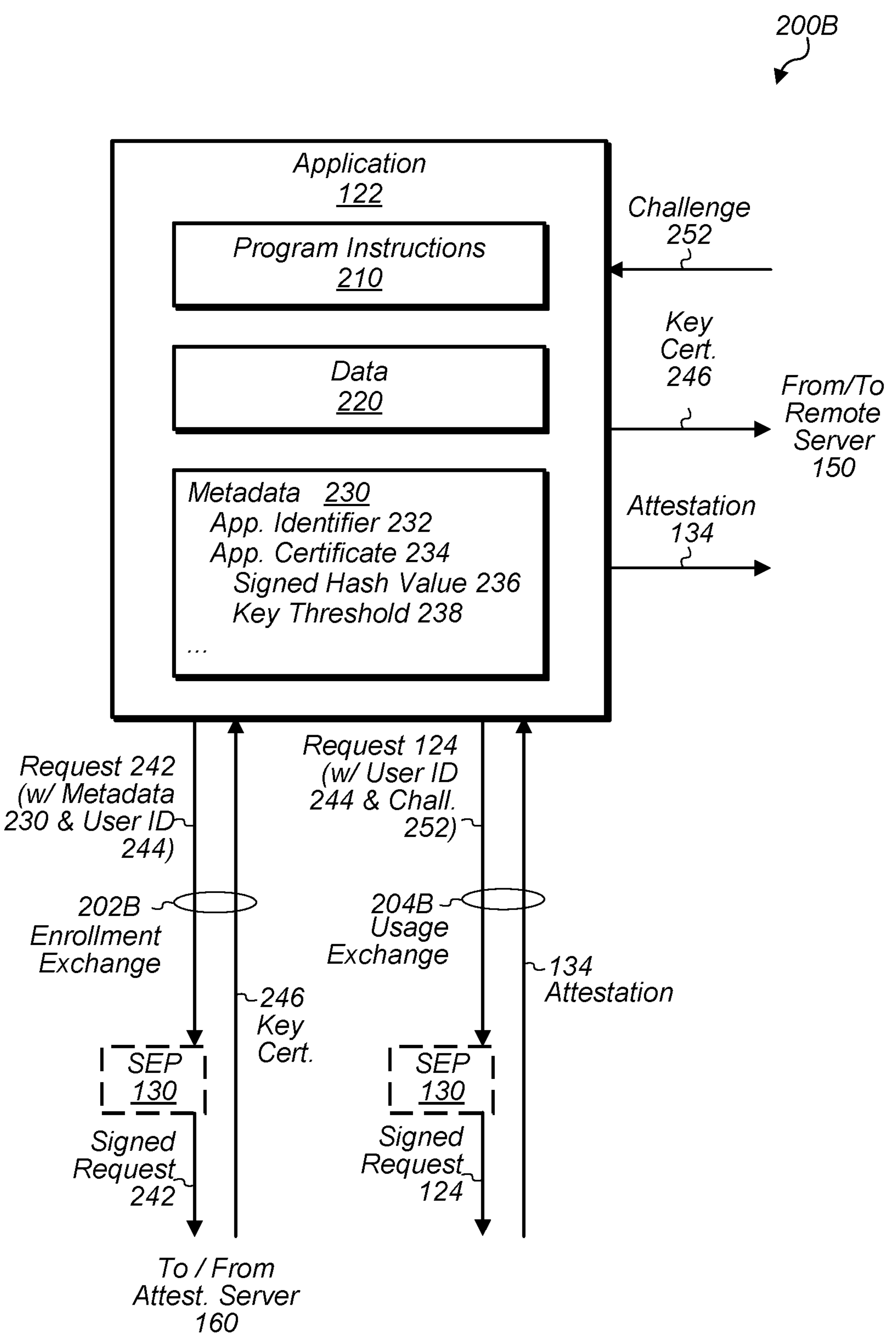
FIG. 2B is a block diagram illustrating an example of an application requesting an attestation from an attestation server of the system.

Turning now to FIG. 2B, a block diagram of an interaction 200B to obtain an attestation 134 generated by server 160 is depicted. As discussed above with interaction 200A, interaction 200B may include an enrollment exchange 202B and one or more usage exchanges 204B. In the illustrated embodiment, enrollment exchange 202B includes application 122 sending an enrollment request 242 to SEP 130, which signs the request 242 using a request key 136 and sends the request on to server 160. As shown, in some embodiments, request 242 includes metadata 230 and a user identifier 244, which are verified by server 160. As noted above, in some embodiments, metadata 230 and/or user identifier 244 may be obfuscated (e.g., through hashing this information) to prevent server 160 from knowing, for example, application identifier 232. In response to a successful verification, server 160 may return a key certificate 246 to application 122. In the illustrated embodiment, usage exchange 204B includes application 122 sending a request 124 to SEP 130, which signs the request using a request key 136 and sending it on to server 160. In some embodiments, this request 124 includes user identifier 244 and challenge 252 (and metadata 230 in some embodiments, which may be obfuscated). In response to receiving request 124 (and performing another verification in some embodiments), server 160 may generate an attestation 134 by signing challenge 252 (or information included challenge 252). Server 160 may then return the generated attestation 134 to application 122, which may deliver the attestation 134 along with the key certificate 246 to remote server 150.

Figure 2C:
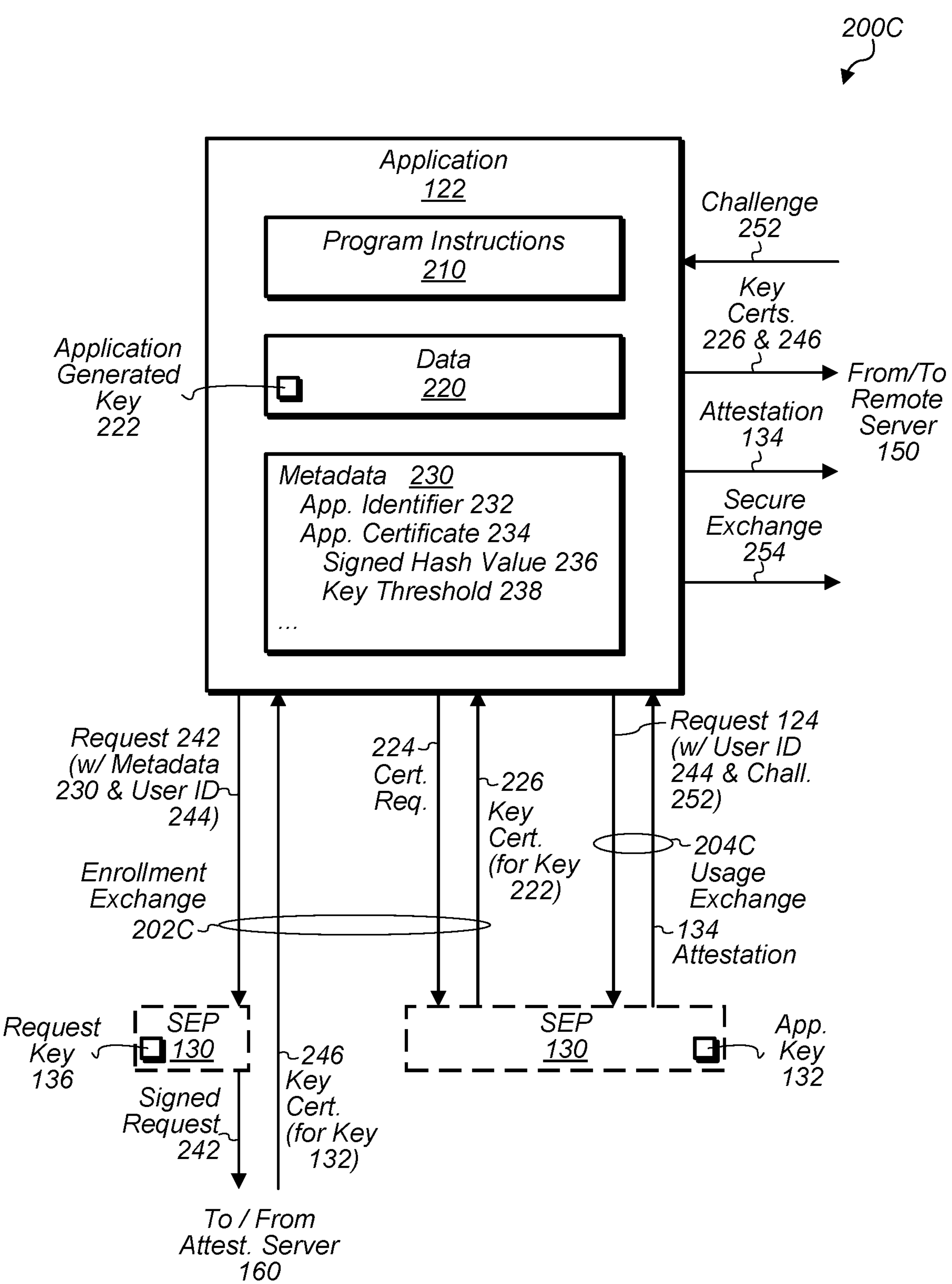
FIG. 2C is a block diagram illustrating an example of an application requesting an attestation associated with an application generated key.

Turning now to FIG. 2C, a block diagram of an interaction 200C to obtain an attestation 134 generated by SEP 130 and associated with an application generated key is depicted. In the illustrated embodiment, interaction 200C includes an enrollment exchange 202C in which application 122 sends an enrollment request 242 as discussed above, and SEP 130 uses key request 136 to sign content in request 242, such as metadata 230 and user ID 244. This signed content may then be conveyed to server 160 for verification. In response to a successful verification, server 160 may issue a certificate certifying application key 132. As part of performing enrollment exchange 202C, however, application 122 may also generate a cryptographic key (shown as application generated key 222), which it may use in its interaction with remote server 150. In the illustrated embodiment, application 122 further sends a certificate request 224 asking SEP 130 to issue a corresponding certificate 226 for application generated key 222. (Although depicted separately for illustration purposes, certificate request 224 may be a part of enrollment request 242 or sent in conjunction with enrollment request 242 in some embodiments.) In some embodiments, SEP 130 uses newly certified application key 132 to sign requested key certificate 226. During usage exchange 204C, SEP 130 may use application key 132, as discussed above, to generate an attestation 134 for an issued challenge 252. Usage exchange 204C, however, may further include application 122 providing certificate 226 for application generated key 222 and using key 222 for some purpose. In the illustrated embodiment, application generated key 222 is used to establish a secure exchange 254 with remote server 150, such as using key 222 in an elliptic-curve Diffie-Hellman (ECDH) exchange to establish a shared key; however, in other embodiments, application generated key 222 may be used by application 122 for various other purposes.

Figure 2D:
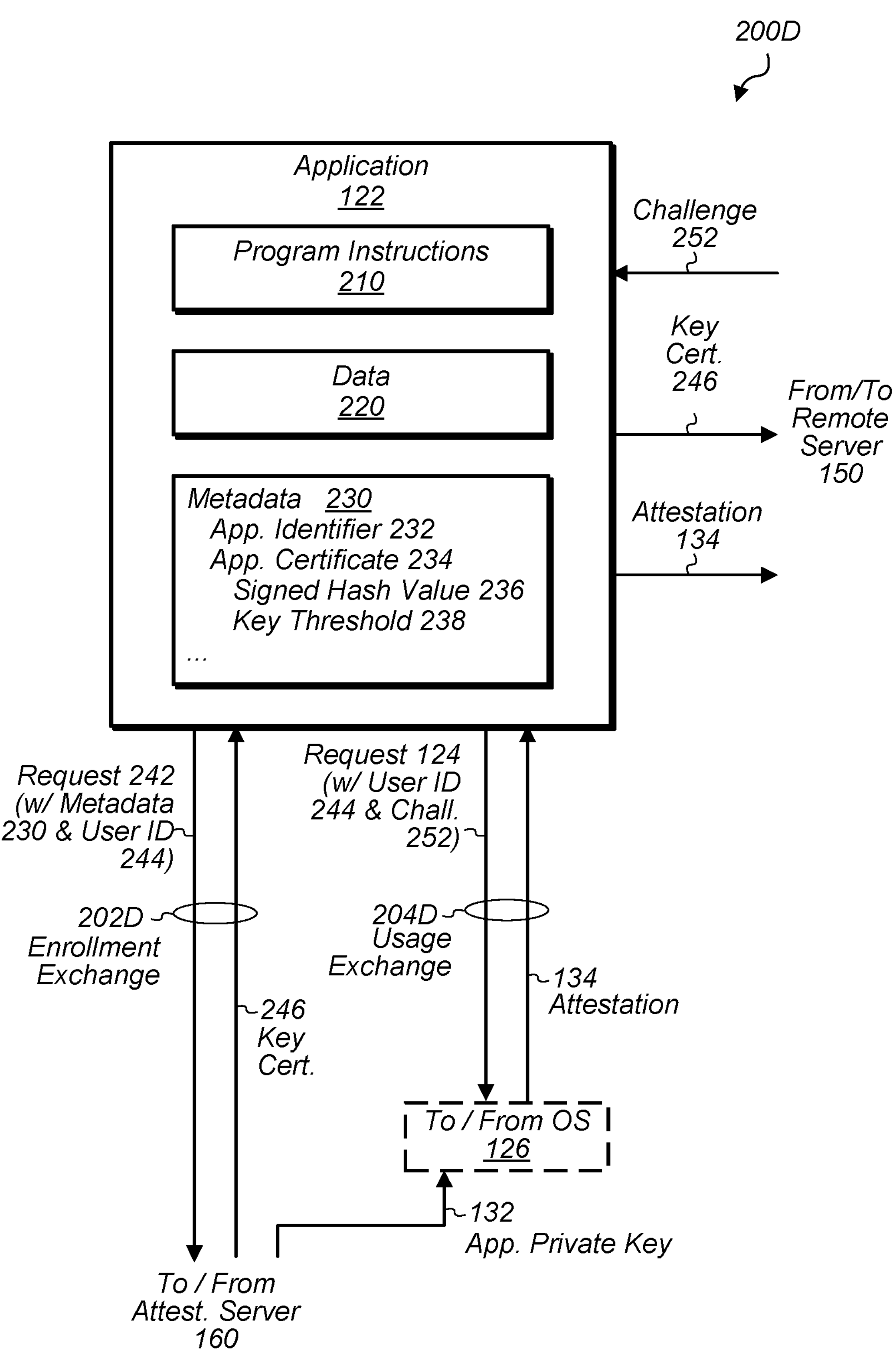
FIG. 2D is a block diagram illustrating an example of an application requesting an attestation generated by an operating system of a computing device within the system.

Turning now to FIG. 2D, a block diagram of an interaction 200D to obtain an attestation 134 generated by OS 126 is depicted. In the illustrated embodiment, attestation server 160 performs the verification of metadata 230, but OS 126 generates attestation 134. As shown, interaction 200D may include an enrollment exchange 202D, which may proceed in a similar manner as exchange 202B with the conveyance of request 242 and key certificate 246. In the illustrated embodiment, however, attestation server 160 generates a public key pair and provides the private application key 132 for use in a subsequent usage exchange 204D. Accordingly, when application 122 issues a subsequent request 124 in exchange 204D, OS 126 uses the private key 132 to generate attestation 134 such as discussed above.

Figure 2E:
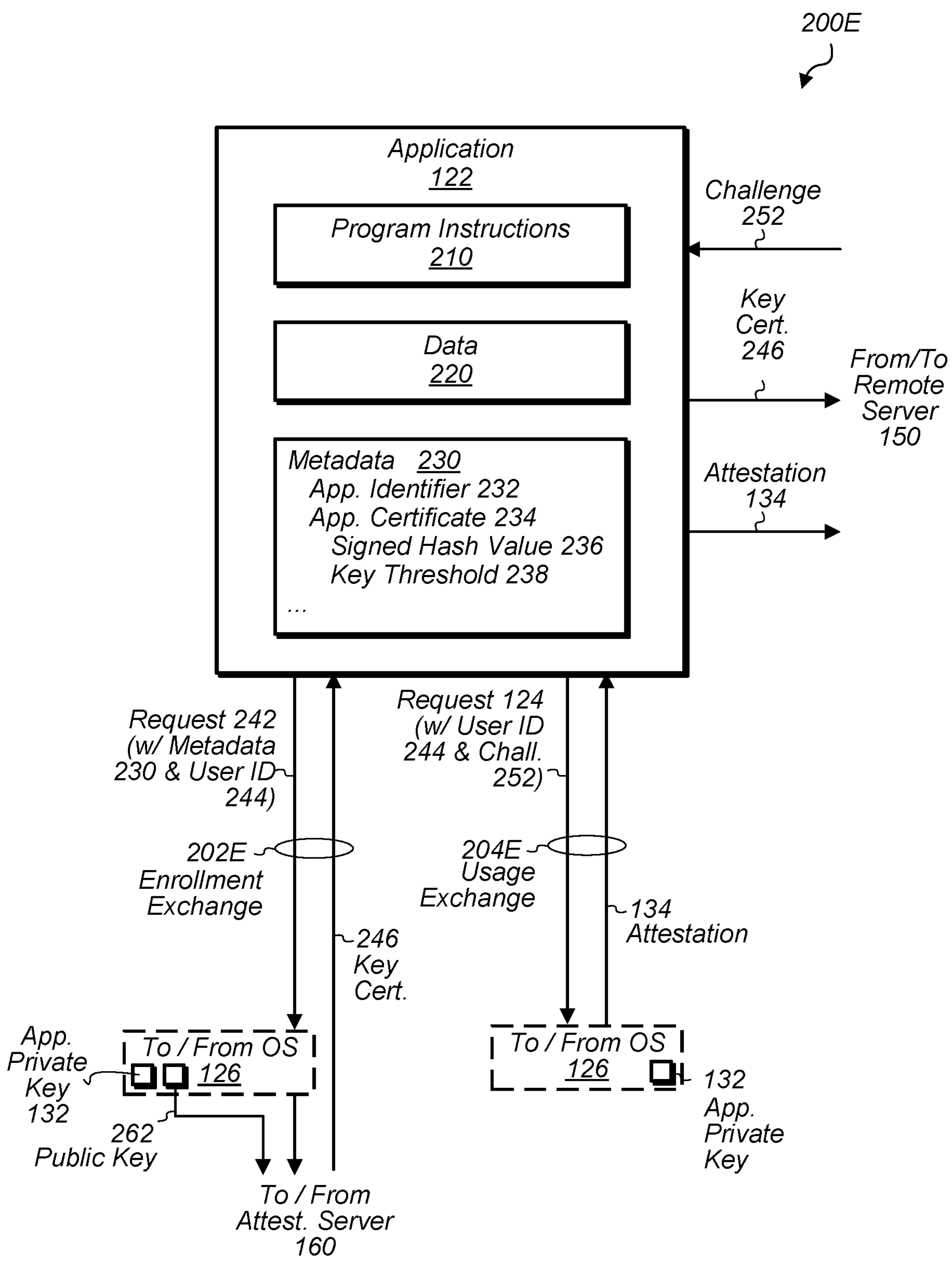
FIG. 2E is a block diagram illustrating an example of an application requesting an attestation generated using a certified key.

Turning now to FIG. 2E, a block diagram of an interaction 200E to obtain an attestation 134 generated by OS 126 and using a certified application key 132 is depicted. In the illustrated embodiment, OS 126 (or SEP 130 in other embodiments) generates a public key pair such that application key 132 is the private key of the pair. During exchange 202E, OS 126 includes, in request 242, the public key 262 of the pair in request 242 and a signature generated from private application key 132. Although not shown, this request 242 may be further signed by SEP 130. Server 160 may then verify the request 242 and issue a corresponding certificate 246 for the application 122 in response to the verification being successful. This verification may be implemented in a similar manner as discussed above with respect to other figures. In some embodiments, server 160 limits the number of valid certificates 246 issued to device 100 for a particular application 122 at a given time. As such, this verification may include verifying that the number of issued certificates 246 does not exceed a threshold (such the one identified by key threshold 238) before issuing a new certificate 246. In some embodiments, certificates 246 may be assigned a short validity period when application private keys 132 are maintained by OS 126 to further limit the number of valid certificates 246. When a usage exchange 204E is later performed, OS 126 uses the certified application key 132 to generate attestation 134 and provides it along with the certificate 246 to server 150 for verification.

In various embodiments, an enrollment exchange 202 may be performed on demand as an application 122 issues a request 242 and/or an older issued key certificate 246 expires. In some instances, this may result in a large number of requests 242 being sent to server 160 when multiple applications 122 on multiple devices 100 are requesting attestations 134. In other embodiments, multiple requests 242 may be grouped together and issued as a periodic batch request to server 160. For example, OS 126 may convey a single batch request once a day for all key certificates 246 requested by applications 122. This asynchronous approach may result in fewer requests being received by server 160. In some embodiments, OS 126 may further track when an attestation 134 associated with a particular application key 132 was last generated. If a particular amount of time (e.g., thirty days) has passed since an attestation 134 associated with the particular application key 132 was issued, OS 126 may forgo asking for a renewal of a certificate 246 in an upcoming batch request. If the corresponding application 122 later asks for an attestation 134 after the certificate 246 has expired and/or its corresponding private key 132 has potentially been deleted, OS 126 may issue a request 242 on demand for a renewed certificate 246 (or, in another embodiment, plan to include the request in the next batch request sent to server 160). In some embodiments, rather than generate a new application key 132, OS 126 may request a renewed certificate 246 for an already existing, previously certified application key 132 in order to reduce the number of instances in which new keys 132 are generated-assuming that such a key 132 is still available and has not been deleted. If, however, a key 132 is has been deleted, OS 126 may generate a new key 132 and request a new certificate 246.

Figure 3:
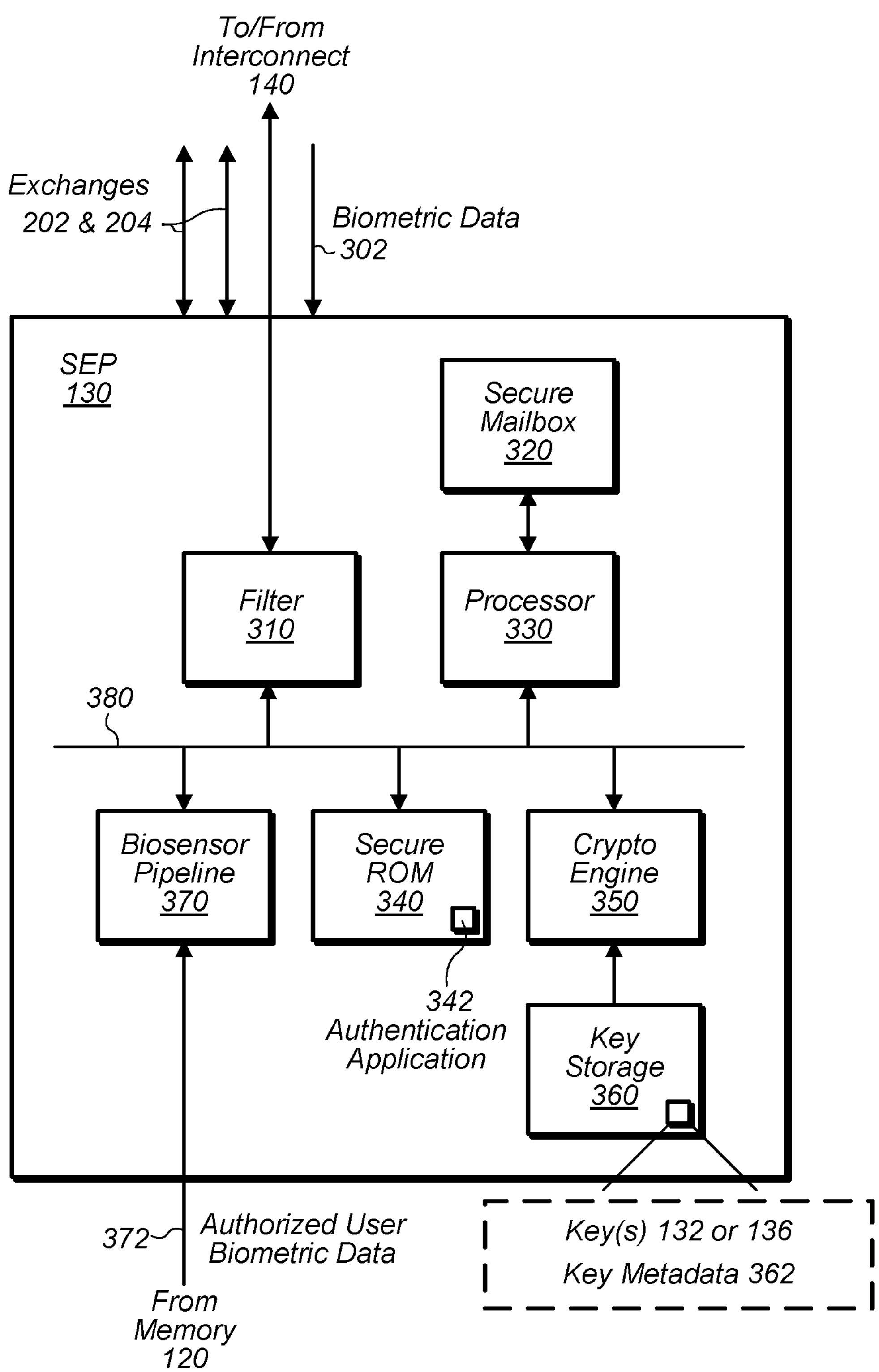
FIG. 3 is a block diagram illustrating an example of the secure enclave processor.

Turning now to FIG. 3, a block diagram of SEP 130 is depicted. In the illustrated embodiment, SEP 130 includes a filter 310, secure mailbox mechanism 320, processor 330, secure ROM 340, cryptographic engine 350, a key storage 360, and a biosensor pipeline 370 coupled together via an interconnect 380. In some embodiments, SEP 130 may include more (or less) components than shown in FIG. 3. As noted above, SEP 130 is a secure circuit having tamper resistance. As discussed below, SEP 130 implements tamper resistance through the use of filter 310 and secure mailbox 320.

Filter 310 is circuitry configured to tightly control access to SEP 130 to increase the isolation of the SEP 130 from the rest of computing device 100, and thus the overall security of the device 100. More particularly, in one embodiment, filter 310 may permit read/write operations from a CPU 110 (or other peripherals coupled to interconnect 140) to enter SEP 130 only if the operations address the secure mailbox 320. Other operations may not progress from the interconnect 140 into SEP 130. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. In some embodiments, filter 310 may respond to other read/write operations with an error. In one embodiment, filter 310 may sink write data associated with a filtered write operation without passing the write data on to local interconnect 380. In one embodiment, filter 310 may supply nonce data as read data for a filtered read operation. Nonce data (e.g., "garbage data") may generally be data that is not associated with the addressed resource within the SEP 130. Filter 310 may supply any data as nonce data (e.g. all zeros, all ones, random data from a random number generator, data programmed into filter 310 to respond as read data, the address of the read transaction, etc.).

In various embodiments, filter 310 may only filter incoming read/write operations. Thus, the components of the SEP 130 may have full access to the other components of computing device 100 such as memory 120. Accordingly, filter 310 may not filter responses from interconnect 140 that are provided in response to read/write operations issued by SEP 130.

Secure mailbox 320 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from interconnect 140. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 may request services of SEP 130 via an application programming interface (API) supported by OS 126—i.e., a requester may make API calls that request services of SEP 130. These calls may cause corresponding requests to be written to mailbox mechanism 320, which are then retrieved from mailbox 320 and analyzed by processor 330 to determine whether it should service the requests. Accordingly, this API may be used to facilitate, for example, exchanges 202 and 204 via mailbox 320. By isolating SEP 130 in this manner, integrity of SEP 130 may be enhanced.

SEP processor 330 is configured to process commands received from various sources in computing device 100. Processor 330 may then execute instructions stored in ROM 340 in order to implement functionality described herein with respect to SEP 130, which may include use various secure peripherals to accomplish the commands. Accordingly, ROM 340 may include program instructions executable to performing operations using keys 132 or 136 discussed above. For example, ROM 340 may program instructions executable to verify application 122 and/or generate attestation 134. In the illustrated embodiment, SEP processor 330 may execute an authentication application 342 to perform an authentication of a user and to provide appropriate commands to biosensor sensor pipeline 370 in order to verify biometric data 302 collected by a biosensor of device 100. Such an authentication may be performed, for example, to unlock device 100, authenticate a user of device 100 to application 122, etc. In program instructions executable to some embodiments, program instructions executed by SEP processor 330 are signed by a trusted authority (e.g., device 10's manufacturer) in order to ensure their integrity.

Secure ROM 340 is a memory configured to store program instruction for booting SEP 130. In some embodiments, ROM 340 may respond to only a specific address range assigned to secure ROM 340 on local interconnect 380. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 130. In some embodiments, secure ROM 340 may include other software executed by SEP processor 330 during use. This software may include the program instructions to process inbox messages and generate outbox messages, etc.

Cryptographic engine 350 is circuitry configured to perform cryptographic operations for SEP 130, including key generation as well as encryption and decryption using keys in key storage 360. Cryptographic engine 350 may implement any suitable encryption algorithm such as Data Encryption Standard (DES), Advanced Encryption Standard (AES), Rivest Shamir Adleman (RSA), etc. In some embodiments, engine 350 may further implement elliptic curve cryptography (ECC). In some embodiments, engine 350 is configured to use keys 132 to generate attestation 134. In other embodiments, engine 350 is configured to use keys 136 to sign requests 242 and/or 124 as discussed above.

Key storage 360 is a local memory (i.e., internal memory) configured to store cryptograph keys. As shown, in some embodiments, storage 360 includes keys 132 or 136. Storage 360 may also include various metadata 362 about keys 132 or 136 and usable to retrieve keys 132 or 136 such as their associated application identifiers, user identifiers, etc. Key storage 360 may include any type of memory such as the various examples of volatile or non-volatile memory listed below with respect to FIG. 5. In some embodiments, storage 360 may also include a set of fuses that are burnt during a fabrication of SEP 130 (or more generally device 100) in order to record keys such as a UID key. Although depicted as residing in storage 360, keys 132 or 136 may be stored externally to SEP 130, but encrypted by one or more keys maintained by SEP 130, which may be stored in storage 360.

Biosensor sensor pipeline 370, in one embodiment, is circuitry configured to compare biometric data 302 captured by a biosensor from a user being authenticated with biometric data 372 of an authorized user. (In another embodiment, data 302 and 327 may be compared by software such as authentication application 342.) Biometric data may be data that uniquely identifies the user among other humans (at least to a high degree of accuracy) based on the user's physical or behavioral characteristics. In some embodiments in which data 302 is collected from a user's face, pipeline 370 may perform the comparison using a collection of neural networks included in pipeline 370, each network being configured to compare biometric data 302 captured in a single frame with biometric data 372 captured in multiple frames for an authorized user. As shown, pipeline 370 may be configured to read, from memory 120, biometric data 372, which may be protected by encryption in some embodiments and/or be stored in an associated part of memory 120 that is only accessible to SEP 130. (In another embodiment, SEP 130 may store data 372 internally.) Based on the comparison of biometric data 302 and 372, SEP 130 may provide an authentication result indicating whether the authentication was successful or failed.

Figures 4A, 4B, 4C:
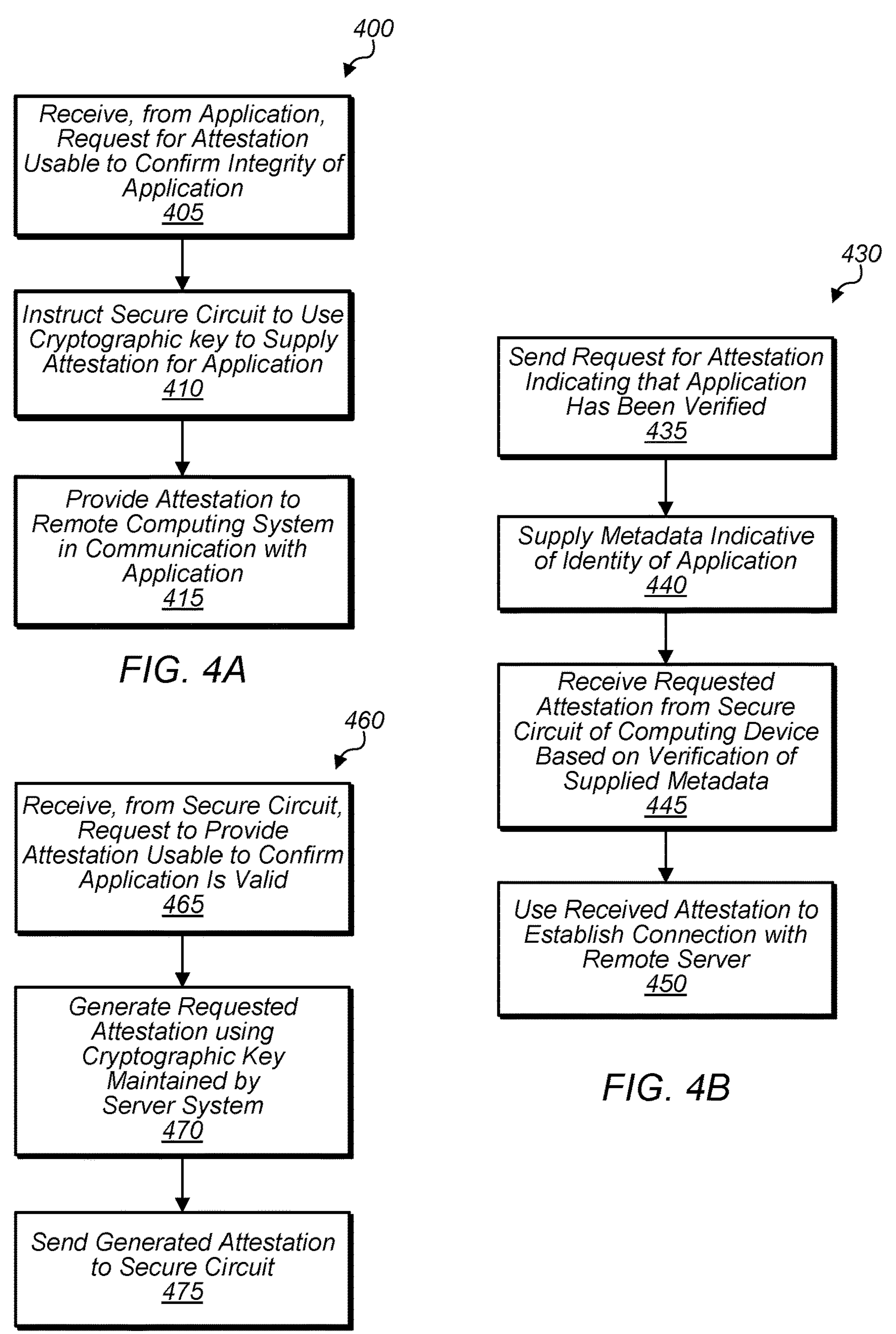
FIGS. 4A-4D are flow diagrams illustrating examples of methods for using an attestation.

Turning now to FIG. 4A, a flow diagram of a method 400 is depicted. Method 400 is one embodiment of a method performed by a computing device executing an application such as a computing device 100. In many instances, performance of method 400 may ensure execution of valid applications.

In step 405, the computing device receives, from an application (e.g., application 122), a request (e.g., request 124) for an attestation (e.g., attestation 134) usable to confirm an integrity of the application.

In step 410, the computing device instructs a secure circuit (e.g., SEP 130) to use one (e.g., an application key 132 or a request key 136) of a plurality of maintained cryptographic keys to supply the attestation for the application. In some embodiments, the secure circuit verifies received metadata (e.g., metadata 230) pertaining to the integrity of the application and uses the cryptographic key to generate the attestation indicative of the integrity of the application. In various embodiments, the metadata includes a certificate (e.g., application certificate 234) identifying a hash value (e.g., hash value 236) signed by a developer of the application. In some embodiments, the secure circuit performs a comparison of the signed hash value and a hash value generated from the application in response to the received request. In some embodiments, the secure circuit generates a public key pair unique to the application such that the cryptographic key is a private key of the public key pair. In some embodiments, the secure circuit provides, to the application, a certificate (e.g., key certificate 246) including a public key of the public key pair, the public key being usable by the remote computing system to verify the attestation. In some embodiments, the certificate includes an identifier of the application (e.g., application identifier 232) and a hash value (e.g., hash value 236) generated from the application. In some embodiments, the secure circuit receives a challenge (e.g., challenge 252) issued by the remote computing system to the application to authenticate the application and generates the attestation by signing the challenge with the private key. In some embodiments, the public key pair is for a particular user of the computing device, and the request for an attestation identifies the particular user. In some embodiments, the secure circuit receives an application certificate (e.g., application certificate 234) from a developer of the application, and the application certificate identifies a threshold number of users (e.g., key threshold 238) for which public key pairs are permitted to be generated. In such an embodiment, the secure circuit verifies that generating the public key pair complies with the threshold number of users. In some embodiments, an operating system verifies metadata (e.g., metadata 230) obtained from the application and pertaining to the integrity of the application, and the operating system performs the instructing based on the verified metadata. In some embodiments, the secure circuit uses the cryptographic key to establish a connection (e.g., by signing request 124) with a server configured to generate the attestation and receives the generated attestation from the server.

In step 415, the computing device provides the attestation to a remote computing system (e.g., remote server 150) in communication with the application.

Turning now to FIG. 4B, a flow diagram of a method 430 is depicted. Method 430 is one embodiment of a method performed by an application attesting to its validity such as application 122. In many instances, performance of method 430 may ensure execution of valid applications.

In step 435, the application sends a request (e.g., request 124) for an attestation (e.g., attestation 134) indicating that the application has been verified.

In step 440, the application supplies metadata (e.g., metadata 230) indicative of an identity of the application. In some embodiments, the metadata is supplied to a secure circuit (e.g., SEP 130), and the secure circuit is configured to verify the metadata in response to the request. In some embodiments, the supplying includes supplying a signed hash value (e.g., signed hash value 236) generated by a developer for an authorized copy of the application, and the secure circuit is configured to verify the hash value prior to generating the attestation.

In step 445, the application receives the requested attestation from a secure circuit of the computing device, the secure circuit being configured to provide the requested attestation based on a verification of the supplied metadata. In some embodiments, the received attestation is signed using a cryptographic key (e.g., application key 132) maintained by the secure circuit for the application. In some embodiments, the cryptographic key is one of a plurality of keys maintained by the secure circuit, and the request for the attestation includes an index value (e.g., user identifier 244) usable by the secure circuit to identify the cryptographic key.

In step 450, the application uses the received attestation to establish a connection with a remote server (e.g., remote server 150).

Turning now to FIG. 4C, a flow diagram of a method 460 is depicted. Method 460 is one embodiment of a method performed by a server system generating an attestation for an application such as attestation server 160. In many instances, performance of method 460 may ensure execution of valid applications.

In step 465, the server system receives, from a secure circuit (e.g., SEP 130) in a computing device (e.g., device 100), a signed request (e.g., signed request 124) to provide an attestation (e.g., attestation 134) for an application (e.g., application 122) executing on the computing device. In various embodiments, the attestation is usable to confirm that the application is valid. In various embodiments, the server system maintains a plurality of cryptographic keys (e.g., application keys 132) for generating attestations for the computing device. In some embodiments, each of the plurality of cryptographic keys is associated with a respective application executing on a computing device. In some embodiments, the server system receives, from the secure circuit, a request (e.g., a signed request 242) to generate the cryptographic key for the application and, prior to generating the cryptographic key, the server system verifies that generating the cryptographic key complies with a limit set by a developer of the application. In such an embodiment, the limit (e.g., key threshold 238) is a number of cryptographic keys permitted to be generated for the application.

In step 470, the server system generates the requested attestation using a cryptographic key maintained by the server system. In some embodiments, prior to generating the requested attestation, the server system verifies metadata (e.g., metadata 230) supplied with the request and pertaining to an identity of the application. In some embodiments, the server system receives, from the secure circuit, an indication that metadata supplied by the application pertaining to an identity of the application has been verified and generates the attestation in response to the indication In step 475, the server system sends the generated attestation to the computing device. In various embodiments, the attestation is used by the application to establish a communication with service (e.g., provided by remote server 150).

Figure 4D:
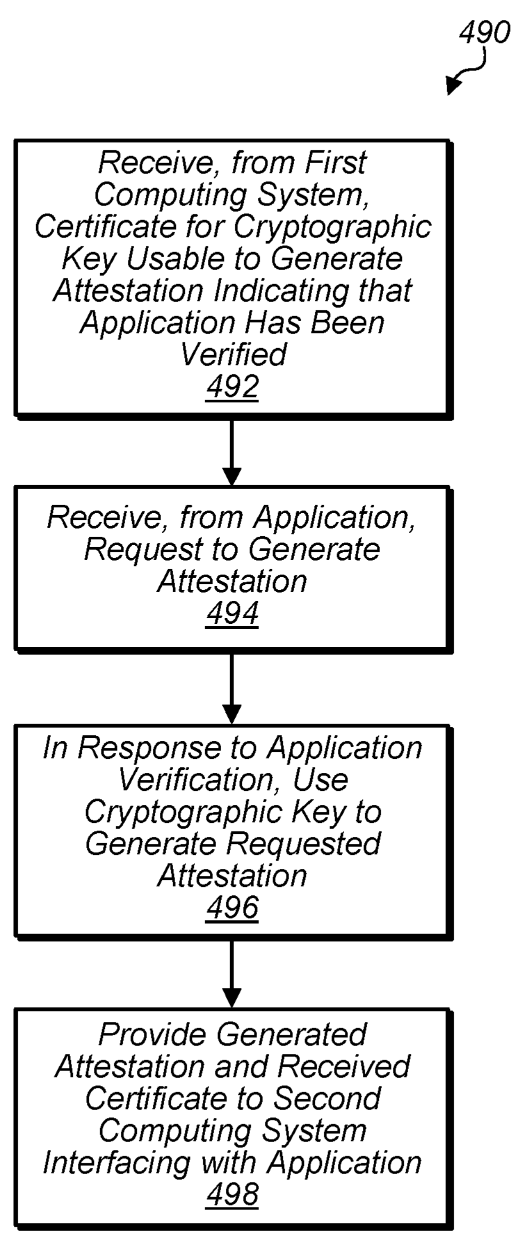

Turning now to FIG. 4D, a flow diagram of a method 490 is depicted. Method 490 is one embodiment of a method performed by a computing device generating an attestation using a key certified by another computer system. In many instances, performance of method 490 may ensure execution of valid applications.

In step 492, the computing device receives, from a first computing system (e.g., attestation server 160), a certificate (e.g., certificate 246) for a cryptographic key (e.g., application key 132) usable to generate an attestation (e.g., attestation 134) indicating that an application (e.g., application 122) has been verified. In various embodiments, the computing device performs an enrollment (e.g., enrollment 202) for the application including generating, for the application, a public key pair including the cryptographic key as a private key of the public key pair and sending a request for the certificate to the first computing system, the request including a public key (e.g., public key 262) of the public key pair and a signature generated by the private key. In some embodiments, the performing includes requesting a secure circuit (e.g., SEP 130) to sign the request (e.g., using a request key 136) prior to sending the request to the first computing system.

In step 494, the computing device receives, from the application, a request (e.g., request 124) to generate the attestation.

In step 496, in response to a verification of the application, the computing device uses the cryptographic key to generate the requested attestation. In some embodiments, the attestation is generated by an operating system (e.g., OS 126) of the computing device. In some embodiments, the attestation is generated by a secure circuit (e.g., SEP 130) of the computing device.

In step 498, the computing device provides the generated attestation and the received certificate to a second computing system (e.g., remote system 150) interfacing with the application. In some embodiments, method 490 includes generating a plurality of cryptographic keys usable to generate attestations for the application, each of the plurality of cryptographic keys being associated with a respective user of the application. In some embodiments, the computing device limits a number of cryptographic keys generated for users of the application based on a threshold value (e.g., key threshold 238) specified by a developer of the application. In some embodiments, the limiting includes removing a previously generated key for a particular user in response to determining to generate a new key for the particular user. In some embodiments, the computing device (or the first computing system) limits a number of certificates issued with respect to the application at a given time.

Exemplary Computer System

Figure 5:
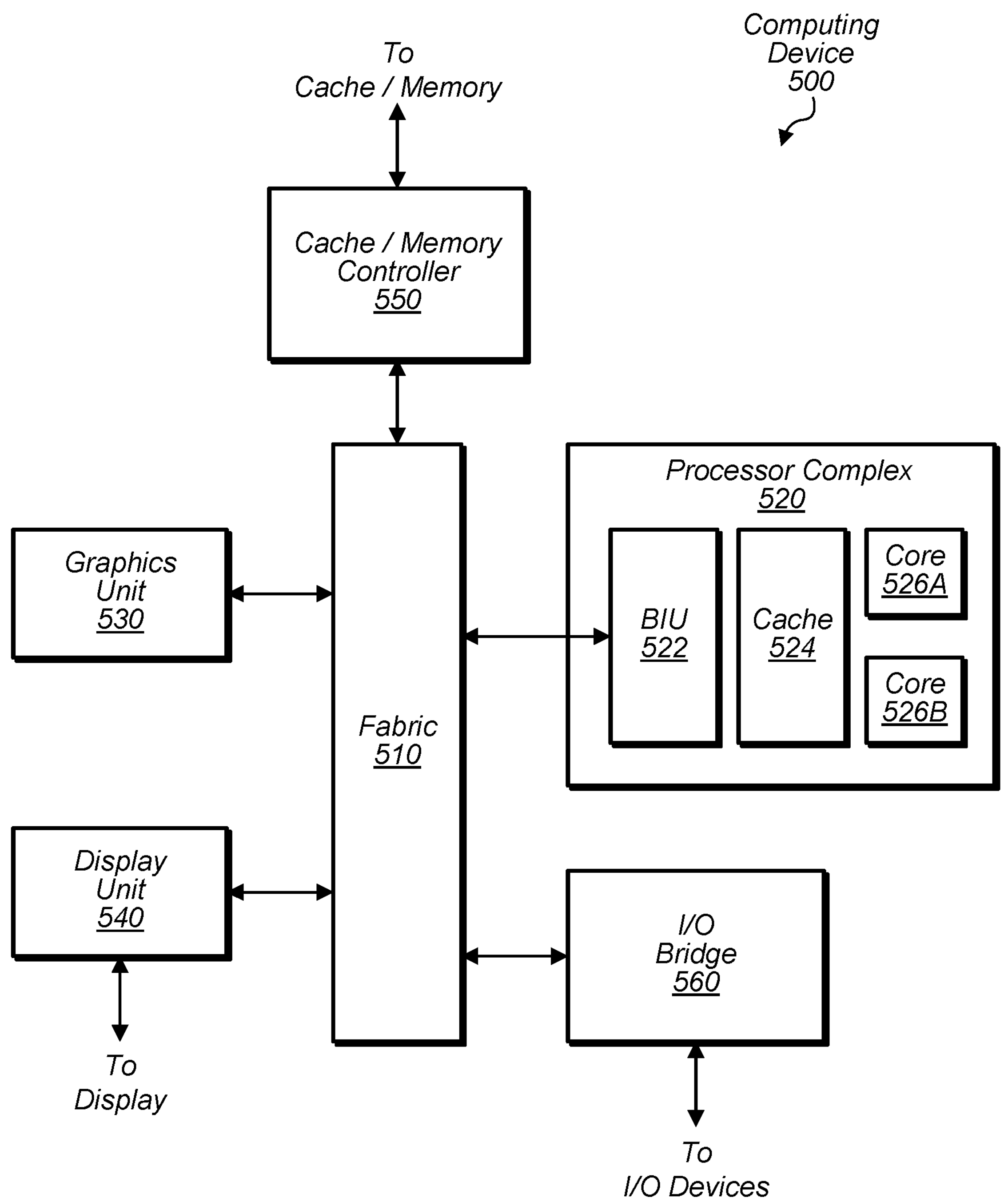
FIG. 5 is a block diagram illustrating an exemplary computer system.

Turning now to FIG. 5, a block diagram illustrating an exemplary embodiment of a computing device 500, which may implement functionality of computing device 100, server 150, and/or server 160, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In some embodiments, elements of device 500 may be included within a system on a chip (SOC). In the illustrated embodiment, device 500 includes fabric 510, processor complex 520, graphics unit 530, display unit 540, cache/memory controller 550, input/output (I/O) bridge 560.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions for OS 126 and user application instructions for application 122. These instructions may be stored in computer readable medium such as a memory coupled to memory controller 550 discussed below. In some embodiments, complex 520 corresponds to CPU 110.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., wifi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various embodiments described herein may gather and/or use data available from specific and legitimate sources to improve the delivery to users of invitational content or any other content that may be of interest to them. The present disclosure contemplates that, in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

What is claimed is:

1. A non-transitory computer readable medium having program instructions stored therein that are executable by a device to perform operations comprising:

performing, by an application executing on the device, an enrollment in which a secure circuit included in the device generates a public key pair for the application to generate a subsequent attestation, wherein the enrollment includes the application receiving a certificate associated with the public key pair and usable to verify attestations;

sending, by the executing application executing on the device, a request for an attestation indicating that the executing application has been verified;

receiving, by the executing application, the requested attestation from the secure circuit included in the device, wherein the secure circuit is configured to provide the requested attestation based on a verification of the integrity of the executing application, wherein the verification includes performing a comparison of a signed hash value and a hash value generated from the executing application in response to the sent request; and using the received attestation to perform an action.

2. The computer readable medium of claim 1, wherein the operations further comprise:

supplying, by the executing application, metadata indicative of an identity of the executing application and usable to verify an integrity of the executing application.

3. The computer readable medium of claim 2, wherein the supplied metadata includes an application certificate associated with a developer of the application.

4. The computer readable medium of claim 2, wherein the supplied metadata includes the signed hash value.

5. The computer readable medium of claim 2, wherein the supplied metadata includes a version number.

6. The computer readable medium of claim 1, wherein the operations further comprise:

receiving, by the executing application, a challenge to be signed during generation of the attestation; and providing, by the executing application, the challenge with the sent request for the attestation.

7. The computer readable medium of claim 1, wherein the operations further comprise:

providing, by the executing application, identification information of a user with the sent request, wherein the attestation is generated using a key associated with the user.

8. The computer readable medium of claim 1, wherein the enrollment is performed during an installation of the application.

9. The computer readable medium of claim 1, wherein the action includes establishing a connection to a server.

10. The computer readable medium of claim 1, wherein the action includes receiving content from a server.

11. The computer readable medium of claim 1, wherein the request is sent via an application programming interface (API) call to an operating system of the device.

12. A device, comprising:

a secure circuit;

a processor; and memory having program instructions stored therein that are executable by the processor to cause the device to perform operations including:

performing, by an application executing on the device, an enrollment process of the application in which the secure circuit is configured to generate a signature key for the application to generate a subsequent attestation, wherein the enrollment includes the application receiving a certificate associated with the signature key and usable to verify attestations; sending, by the executing application executing on the device, a request for an attestation indicating that the executing application has been verified; receiving, by the executing application, the requested attestation from the secure circuit, wherein the secure circuit is configured to provide the requested attestation based on a verification of the integrity of the executing application, wherein the verification includes performing a comparison of a signed hash value and a hash value generated from the executing application in response to the sent request; and using the received attestation to perform an action.

13. The device of claim 12, wherein the operations further include:

receiving, by the executing application, information to be signed during generation of the attestation; and providing, by the executing application, the information with the sent request for the attestation.

14. A method, comprising:

performing, by an application executing on a device, an enrollment in which a secure circuit included in the device generates a public key pair for the application to generate a subsequent attestation, wherein the enrollment includes the application receiving a public key of the public key pair and usable to verify attestations;

sending, by the executing application executing on a device, a request for an attestation indicating that the executing application has been verified;

receiving, by the executing application, the requested attestation from a secure circuit included in the device, wherein the secure circuit is configured to provide the requested attestation based on a verification of the integrity of the executing application, wherein the verification includes performing a comparison of a signed hash value and a hash value generated from the executing application in response to the sent request; and using the received attestation to perform an action.

15. The method of claim 14, further comprising:

supplying, by the executing application, metadata associated with an identity of the executing application and usable to verify an integrity of the executing application.

16. The method of claim 15, wherein the metadata includes user information associated with a user of the application.

* * * * *